United States Patent
Min et al.

(10) Patent No.: US 7,343,233 B2
(45) Date of Patent: Mar. 11, 2008

(54) METHOD AND SYSTEM FOR PREVENTING ERRONEOUS STARTING OF A VEHICLE HAVING A MANUAL TRANSMISSION

(76) Inventors: Byung Woo Min, 2001 Manistee Dr., La Canada, CA (US) 91011; Jim Speers, #12 Lorne Crescent, St. Albert, Alberta (CA) T8N 2R5

(*) Notice: Subject to any disclaimer, the term of this patent is extended or adjusted under 35 U.S.C. 154(b) by 585 days.

(21) Appl. No.: 10/811,456

(22) Filed: Mar. 26, 2004

(65) Prior Publication Data

US 2005/0216148 A1   Sep. 29, 2005

(51) Int. Cl.
*G01M 17/00* (2006.01)
*G06F 19/00* (2006.01)

(52) U.S. Cl. .............. 701/29; 701/2; 701/45; 477/183; 307/10.6; 180/167

(58) Field of Classification Search .......... 701/29, 701/45, 51, 2; 307/10.6; 123/179.2; 477/183; 290/38 R
See application file for complete search history.

(56) References Cited

U.S. PATENT DOCUMENTS

| 4,345,554 A | * | 8/1982 | Hildreth et al. .......... 123/179.2 |
| 5,736,923 A | * | 4/1998 | Saab ........................ 340/429 |
| 5,757,086 A | * | 5/1998 | Nagashima ................ 307/10.6 |
| 6,786,846 B2 | * | 9/2004 | Chang ........................ 477/99 |
| 2004/0178050 A1 | * | 9/2004 | Wylde ....................... 200/61.88 |
| 2004/0212196 A1 | * | 10/2004 | Marcoz .................... 290/38 R |

* cited by examiner

*Primary Examiner*—Tan Q. Nguyen
(74) *Attorney, Agent, or Firm*—John K. Park; Park Law Firm

(57) ABSTRACT

A safety system and method for a manual transmission vehicle with a remote starter is provided. The system includes a motion transducer module detecting motion of the vehicle and a controller module deciding erroneous starting of the vehicle and stopping the vehicle when erroneous starting is decided. The controller module receives motion data from the motion transducer module. A baseline is set in the detected motion data, and the controller module calculates number of baseline crossings that occur within a predetermined time frame in the motion data. The controller module decides erroneous starting based on the number of baseline crossings. The controller module adjusts the baseline based on averaged motion data from the motion transducer module when the remote starter is inactive.

4 Claims, 6 Drawing Sheets

METHOD AND SYSTEM FOR PREVENTING ERRONEOUS STARTING OF A VEHICLE HAVING A MANUAL TRANSMISSION

BACKGROUND OF THE INVENTION

The present invention relates to a method and system for preventing erroneous starting of a vehicle having a manual transmission. More particularly, this invention relates to a simple and reliable safety system and method for preventing erroneous starting of a vehicle having a manual transmission when a remote starter is used.

When a remote starter is used for manual transmission vehicles, safety is a huge concern. If a remote starter starts the vehicle when it is in gear, it will lurch forward and can create costly damages or cause injuries to people. Some manufacturers do not offer remote starters for manual transmission vehicles and some offer them with safety devices and methods that prevent a driver from leaving a vehicle in gear.

Such devices and methods force a driver to put the vehicle in a neutral position but this can be circumvented or faulty sensor will start the vehicle in gear by a remote starter.

A safety device for a manual transmission vehicle, which is reliable and independent, has long been in need.

SUMMARY OF THE INVENTION

The present invention contrives to solve the disadvantages of the prior art.

An objective of the invention is to provide a safety system for a manual transmission vehicle that prevents erroneous moving of the vehicle.

Another objective of the invention is to provide a safety system for a manual transmission vehicle, which is not affected by malfunction of other devices of the vehicle.

Still another objective of the invention is to provide a safety system for a manual transmission vehicle, which can evaluate vehicle's specific conditions so that a lurch condition is clearly distinguished from normal driving conditions.

To achieve the above objectives, the present invention provides a safety system for a vehicle having an engine and a manual transmission. The system includes a motion transducer module detecting motion of the vehicle, and a controller module deciding erroneous starting of the vehicle and stopping the vehicle when erroneous starting is decided. The controller module receives motion data from the motion transducer module. A baseline is set in the detected motion data. The controller module calculates number of baseline crossings that occur within a predetermined time frame in the motion data. The controller module decides erroneous starting based on the number of baseline crossings.

Preferably, the predetermined time frame is about 250 millisecond.

The vehicle may further include a remote starter that receives signal from a remote controller, and starts the engine of the vehicle. The controller module stops the remote starter from cranking the engine when erroneous starting is decided.

Preferably, the controller module adjusts the baseline so that the baseline incorporates specific characteristics of the vehicle. The controller module adjusts the baseline based on averaged motion data from the motion transducer module when the remote starter is inactive.

The controller module starts calculating the number of baseline crossings when the motion data shows a predefined variation from the baseline, which indicates that the vehicle is being started.

The motion transducer module includes an accelerometer, which senses acceleration in one-dimension, two-dimension or three-dimension.

The safety system may include a signal conditioning module that buffers and filters the motion data from the motion transducer module.

The present invention also provides a method for preventing erroneous starting of a vehicle having a manual transmission and an engine. The method includes the steps of detecting motion of the vehicle, deciding erroneous starting of the vehicle based on the detected motion data, and stopping the vehicle when erroneous starting has been decided. A baseline is set in the detected motion data, and erroneous starting is decided based on number of baseline crossings that occur within a predetermined time frame in the motion data.

The method may further includes a step of receiving signal from a remote controller and activating a remoter starter that starts the engine of the vehicle before the step of detecting motion of the vehicle.

Preferably, the method further includes a step of adjusting the baseline so that the baseline incorporates specific characteristics of the vehicle. The baseline is adjusted based on averaged motion data when the remote starter is inactive.

In the step of deciding erroneous starting, the number of baseline crossings starts to be calculated when the motion data shows a predefined variation from the baseline, which indicates that the vehicle is being started.

The advantages of the present invention are: (1) the safety system of the present invention can reliably distinguish the lurch condition from normal driving conditions; (2) the safety system can be adjusted to fit the specific environment including the vehicle to which it is installed and installation process; (3) a user can customize the operation of the system; and (4) the safety system provides an additional safety to current remote starters in the market.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Figure 1:
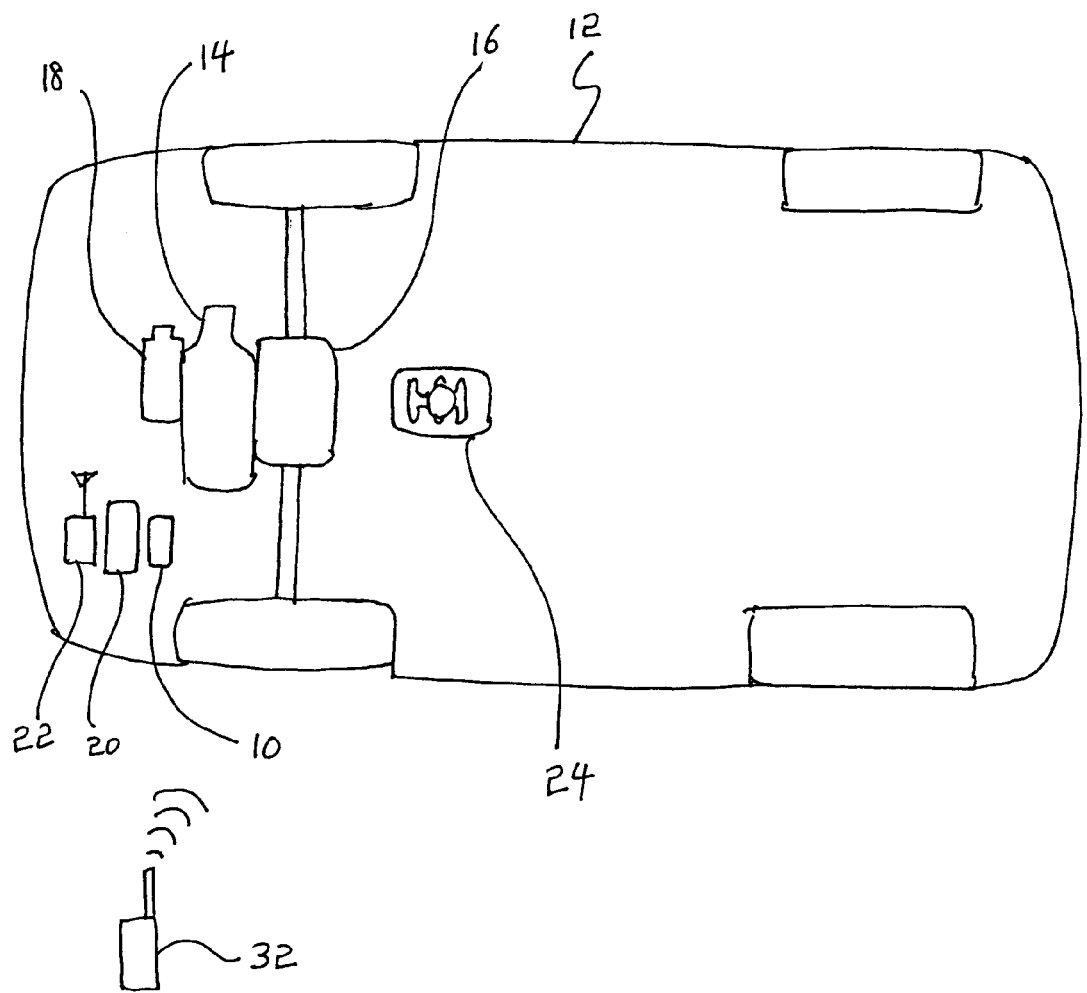
FIG. 1 is a schematic diagram showing how a safety system of the present invention is used for a vehicle having a manual transmission.

FIG. 1 shows a safety system 10 of the present invention, and a vehicle 12 in which the safety system 10 is installed. The vehicle 12 includes an engine 14, a manual transmission 16, a starter 18, a vehicle control module 20 that controls the engine and other parts, a remote starter 22, and a shift lever 24.

Figure 2:
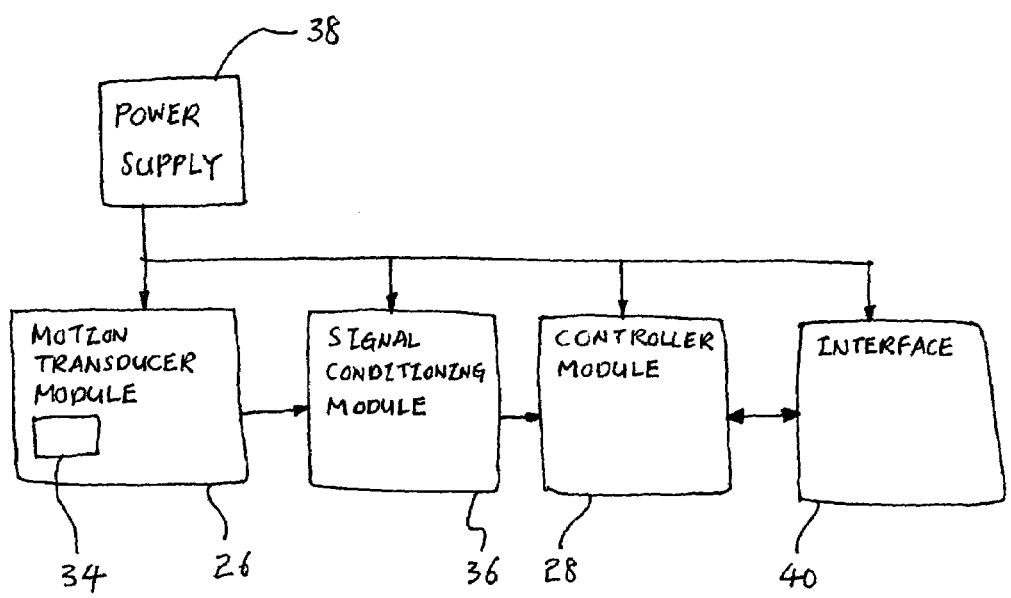
FIG. 2 is a schematic diagram showing the safety system.

FIG. 2 shows that the safety system 10 includes a motion transducer module 26, which detects motion of the vehicle 12, and a controller module 28, which decides erroneous starting of the vehicle and stops the vehicle 12 when erroneous starting is decided.

Figure 4:
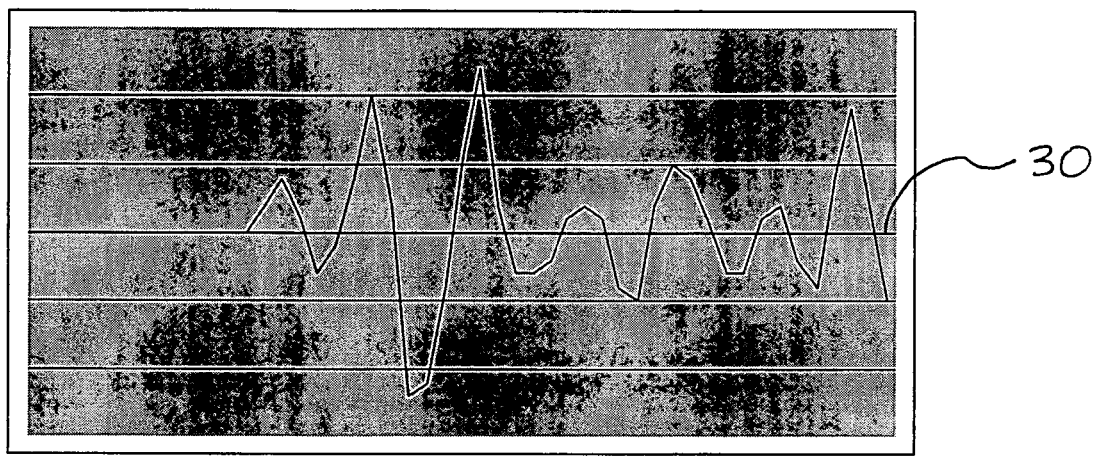
FIG. 4 is a graph showing readings from a accelerometer.

The motion transducer module 26 is used to convert acceleration or motion of the vehicle 12 into an electrical signal. The controller module 28 receives motion data from the motion transducer module 26. As shown in FIG. 4, a baseline 30 is set in the detected motion data. The controller module 28 calculates number of baseline crossings that occur within a predetermined time frame in the motion data. The controller module 28 decides erroneous starting based on the number of baseline crossings. The controller module 28 uses a microcontroller to evaluate the signal from the motion transducer module 34 and make a decision as to whether a lurch condition is present or not.

Preferably, the predetermined time frame is about 250 millisecond.

The remote starter 22 receives signal from a remote controller 32, and starts the engine 14 of the vehicle 12. The controller module 28 stops the remote starter 22 from cranking the engine 14 when erroneous starting is decided. That is, the safety system 10 will shut down the remote starter 22 from cranking (starting the vehicle 12) when it detects the movement of the vehicle 12 during the cranking period (starting the car) and remote started period (engine on period).

Due to the vehicle to vehicle variations and the inconsistencies in the installation process it may be required that the safety system 10 learn the characteristics of the vehicle 12 in which it is installed.

Preferably, the controller module 28 adjusts the baseline 30 so that the baseline 30 incorporates specific characteristics of the vehicle 12. The controller module 28 adjusts the baseline 30 based on averaged motion data from the motion transducer module 26 when the remote starter 22 is inactive.

The controller module 28 starts calculating the number of baseline crossings when the motion data shows a predefined variation from the baseline 30, which indicates that the vehicle 12 is being started.

The motion transducer module 26 comprises an accelerometer 34. It would likely be possible to use other sensors such as tilt or motion sensors instead of the accelerometer 34. In the embodiment, 2 axis (two dimension) accelerometer is used. Also, three-dimension accelerometer would work as well and possibly even a single axis device.

The safety system 10 may further include a signal conditioning module 36 that buffers and filters the motion data from the motion transducer module 26. Analog circuitry is used to buffer and filter the signal from the motion transducer module 26 before it is input to the controller module 20.

The system 10 is capable of identifying the lurch condition. If a lurch is detected, the system 10 will signal the control module 20 to immediately turn off the vehicle 12. The key is to use the motion transducer module 26 capable of converting any movement of the vehicle 12 into an electrically measurable property. The output of the motion transducer module 26, that is, the motion data, is processed using analog circuitry and digital signal processing by the signal conditioning module 36. The signal processing is required to differentiate the lurch from normal and acceptable conditions. When the vehicle 12 is first started, there is motion due to the starter 18 and vibrations once the vehicle 12 is running. The motion transducer module's 26 output can also be affected by the inclination of the vehicle 12 when it is parked on a hill. During installation of the safety system 10, it is difficult to ensure that the equipment is installed in a consistent orientation to the vehicle 12. Variations in the orientation will affect the response of the motion transducer module 26 to the vehicle's 12 motion. All these variations need to be dealt with through analog and digital signal processing.

The safety system 10 also includes a power supply 38 and an interface 40 to the remote starter 22 or other part of the vehicle 12. The power supply 38 is used to supply power to the rest of the safety system 10. It is based around a voltage regulator, U1 (refer to FIG. 6). The input power is obtained from the vehicle 12.

Figure 5:
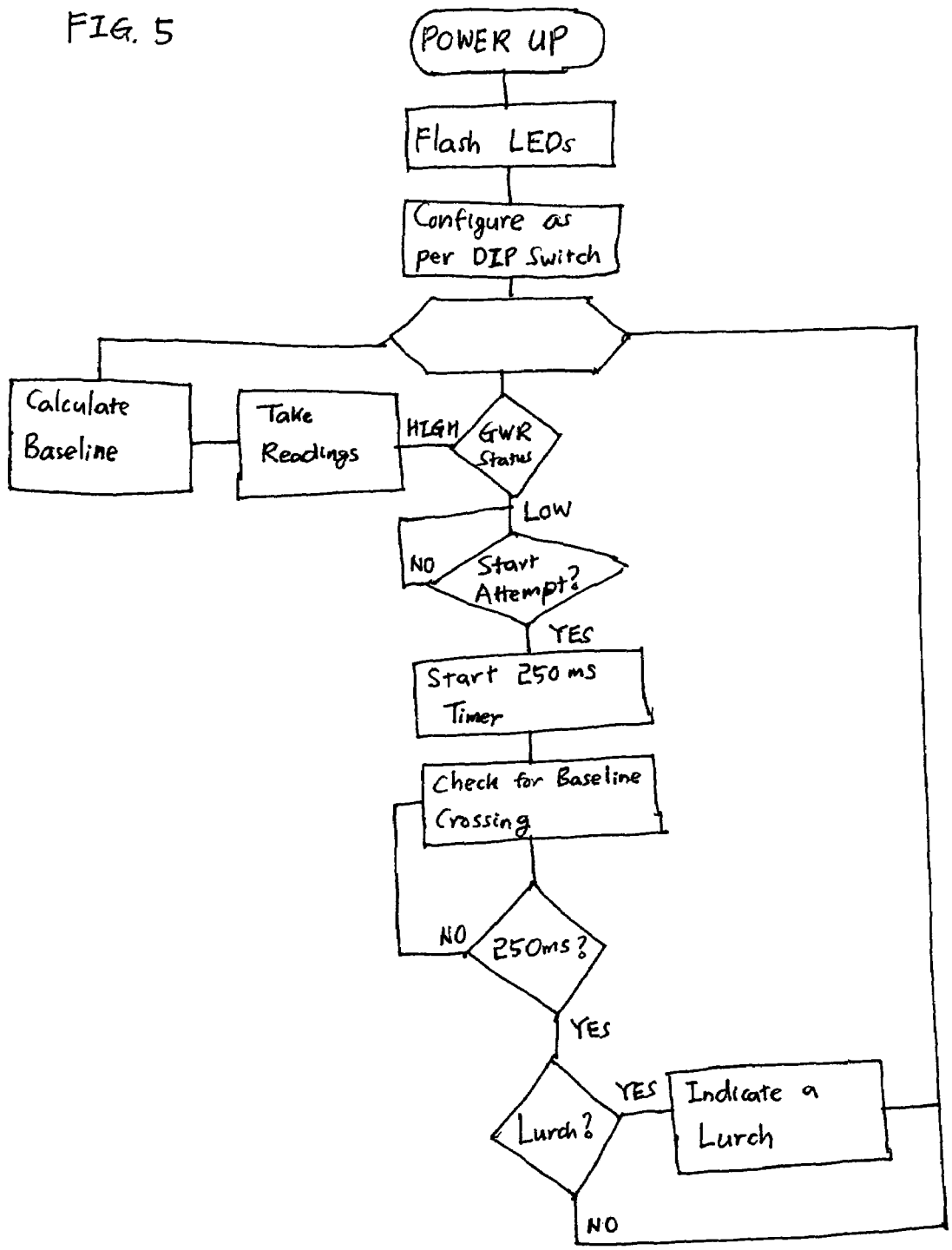
FIG. 5 is a flow diagram showing a firmware for the safety system.

FIG. 5 shows a flow diagram of a firmware that is installed in the controller module 20. When the vehicle 12 starts under safe conditions there is movement but it has different characteristics than a lurch condition. The firmware must be able to reliably differentiate between the two conditions. The firmware looks at the number of baseline crossings that occur within the set time frame. The baseline can be affected by temperature and the inclination of the vehicle and these variations need to be compensated for.

There is an input to the safety system 10 from the remote starter 22, GWR, that indicates that the remote starter 22 is attempting to start the vehicle 12 or that the vehicle 12 is running. GWR represents "Ground output While Run"—This is a (−) output from the remote starter 22 which turns on while the remote starter 22 is engaged. This output is used to turn on bypass units or other devices that may need to be turned on while the remote starter 22 is engaged.

While GWR is inactive, the safety system 10 continually takes samples of the accelerometer 34 output and averages them. This takes care of changes of value due to temperature, vehicle position, and any sensor variations. When the input goes into an active state, the present average values of the accelerometer 34 readings are used as the baseline 30.

When the GWR goes, active the device watches for a reading from the accelerometer that is a certain variation from the baseline. This variation is used to indicate the beginning of an attempted start. It then starts the 250 millisecond phase during which the number of times the accelerometer reading crosses the baseline is recorded. Based upon the number of crossings a decision is made if the start condition was a lurch or a safe start condition.

Essentially this is a method of determining the dominant frequency of a vibrational movement. This frequency is different for a safe start and a lurch condition.

This analysis could also be done with a Fast Fourier Transform (FFT), or similar method. FIG. 4 gives a visual description of the readings from the accelerometer.

Figure 6:
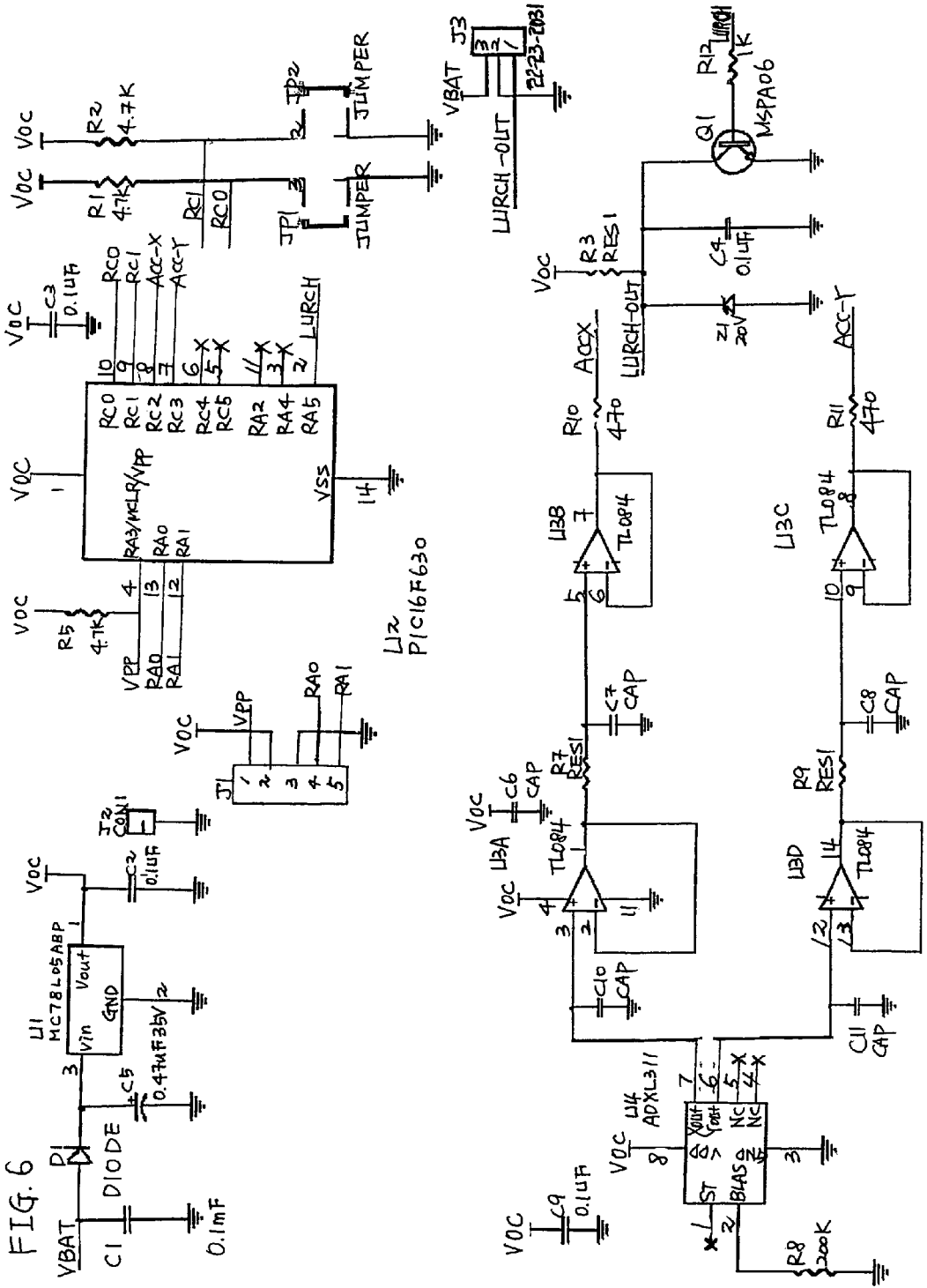
FIG. 6 is a circuit diagram for the safety system.

FIG. 6 shows a circuit that implements the safety system 10. In the safety system 10, the user can set two jumpers to vary the operating parameters of the safety system 10. In normal driving conditions, the output of the safety system 10 is pulled low. When a lurch condition is detected the output is pulled high. This provides a fail-safe operation.

Figure 3:
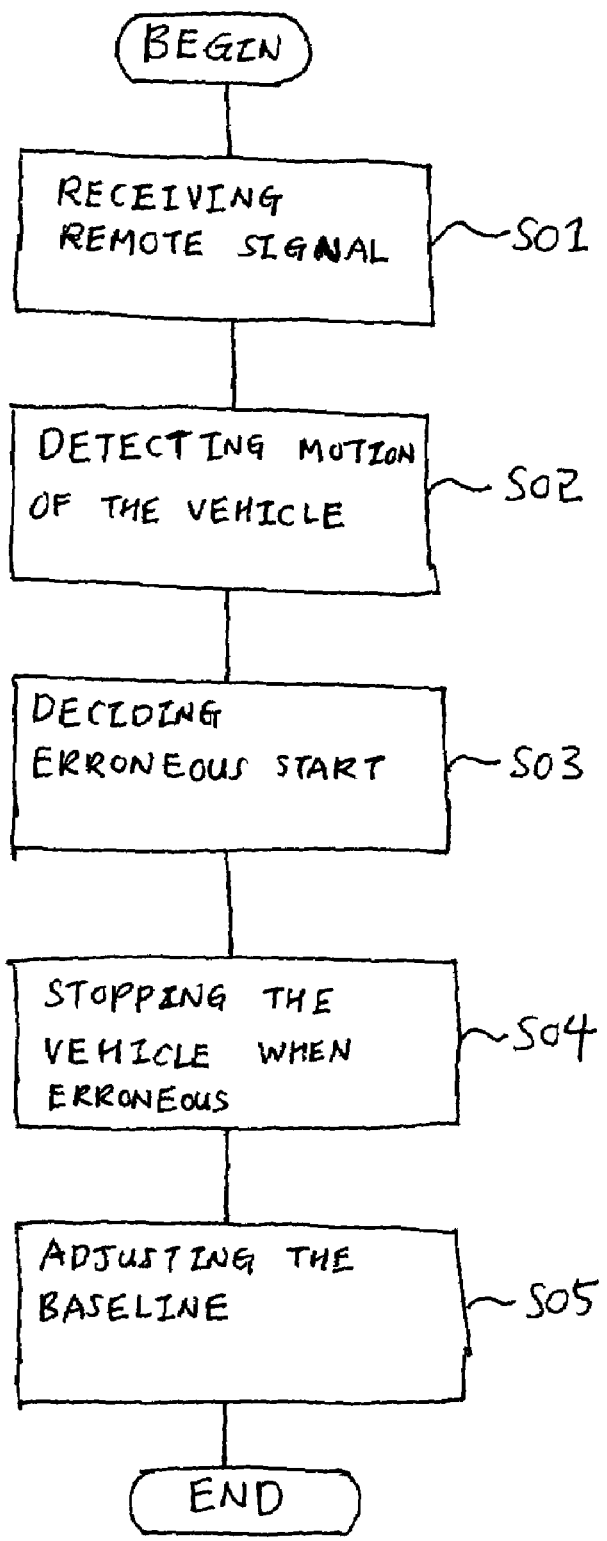
FIG. 3 is a flow diagram showing a safety method of the present invention.

FIG. 3 shows a method for preventing erroneous starting of the vehicle 12. The method includes step S02 of detecting motion of the vehicle 12, step S03 of deciding erroneous starting of the vehicle based on the detected motion data, and step S04 of stopping the vehicle 12 when erroneous starting has been decided. The baseline 30 is set in the detected motion data, and erroneous starting is decided based on number of baseline crossings that occur within the predetermined time frame in the motion data.

The method may further include step S01 of receiving signal from the remote controller 32 and activating a remoter starter 22 that starts the engine 14 of the vehicle 12 before step S02.

Preferably, the method further includes step S05 of adjusting the baseline 30 so that the baseline 30 incorporates specific characteristics of the vehicle 12. The baseline 30 is adjusted based on averaged motion data when the remote starter is inactive.

In step S03, the number of baseline crossings starts to be calculated when the motion data shows a predefined variation from the baseline 30, which indicates that the vehicle 12 is being started.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A safety system for a vehicle having an engine and a manual transmission, the system comprising:
    a) a motion transducer module detecting motion of the vehicle; and
    b) a controller module deciding erroneous starting of the vehicle and stopping the vehicle when erroneous starting is decided;
    wherein the controller module receives motion data from the motion transducer module, wherein a baseline is set in the detected motion data, wherein the controller module calculates number of baseline crossings that occur within a predetermined time frame in the motion data, wherein the controller module decides erroneous starting based on the number of baseline crossings,
    wherein a remote starter, which receives signal from a remote controller and starts the engine of the vehicle, is provided in the vehicle, wherein the controller module stops the remote starter from cranking the engine,
    wherein the controller module adjusts the baseline so that the baseline incorporates specific characteristics of the vehicle.

2. The safety system of claim 1, wherein the controller module adjusts the baseline based on averaged motion data from the motion transducer module when the remote starter is inactive.

3. A method for preventing erroneous starting of a vehicle having a manual transmission and an engine, the method comprising the steps of:
    a) detecting motion of the vehicle;
    b) deciding erroneous starting of the vehicle based on the detected motion data; and
    c) stopping the vehicle when erroneous starting has been decided;
    wherein a baseline is set in the detected motion data,
    wherein erroneous starting is decided based on number of baseline crossings that occur within a predetermined time frame in the motion data,
    wherein the method further comprising a step of receiving signal from a remote controller and activating a remoter starter that starts the engine of the vehicle before the step of detecting motion of the vehicle, and
    a step of adjusting the baseline so that the baseline incorporates specific characteristics of the vehicle.

4. The method of claim 3, the baseline is adjusted based on averaged motion data when the remote starter is inactive.

* * * * *